United States Patent [19]
Gall et al.

[11] 4,319,281
[45] Mar. 9, 1982

[54] TELEVISION IMAGE RECORDING APPARATUS

[75] Inventors: Arthur Gall; Paul Marhoff, both of Erlangen-Bruck, Fed. Rep. of Germany

[73] Assignee: Siemens Aktiengesellschaft, Berlin & Munich, Fed. Rep. of Germany

[21] Appl. No.: 182,573

[22] Filed: Aug. 29, 1980

[30] Foreign Application Priority Data

Sep. 7, 1979 [DE] Fed. Rep. of Germany ....... 2936228

[51] Int. Cl.³ .............................................. H04N 5/84
[52] U.S. Cl. ................................ 358/244; 346/110 R; 355/20
[58] Field of Search ....................... 358/244, 130, 250; 346/110 R; 355/20

[56] References Cited

U.S. PATENT DOCUMENTS

| | | | |
|---|---|---|---|
| 2,385,681 | 9/1945 | Brick | 358/130 |
| 3,328,522 | 6/1967 | Stone | 358/130 |
| 3,507,575 | 4/1970 | Sovle | 358/244 |

FOREIGN PATENT DOCUMENTS 2385116 10/1978 France ................................ 358/244

OTHER PUBLICATIONS

Video-Imager Series Advertisement by Matrix.
Image Recording Device Advertisement by Sokara.

*Primary Examiner*—Bernard Konick
*Assistant Examiner*—Alan Faber
*Attorney, Agent, or Firm*—Hill, Van Santen, Steadman, Chiara & Simpson

[57] ABSTRACT

In a device that photographs a television screen a plurality of lenses are adjacently arranged on exchangeable lens supports. In order to achieve a higher image frequency and in order to avoid operating errors during the positioning of the lenses, the disclosure provides that the lens supports carrying the lenses are positioned in the image recording apparatus in a waiting position, and are selectively shifted by means of individual drives into the active position; a television monitor is moved into the correct distance relative to the selected lens support via an additional positioning drive.

11 Claims, 4 Drawing Figures

TELEVISION IMAGE RECORDING APPARATUS

BACKGROUND OF THE INVENTION

The invention relates to an image recording apparatus comprising a plurality of lenses, provided with one separate shutter each, the lenses being arranged for selective positioning in the optical path, a television monitor with its fluorescent screen arranged to project images to be recorded via the optical path, a film supply- and a film collector-magazine, and a transport device for conveyance of individual film sheets from the film supply magazine into an exposure position in the optical path, and from the exposure position into the film collector magazine.

Image recording apparatus are employed in order to transfer onto a film, via a television display unit, image data present in data memories, such as are e.g. employed in computer tomography or in the case of ultrasonic apparatus, for the purpose of documentation and-/or for examination purposes. However, it is also possible with ultrasonic apparatus to retain discrete processes on a film via a television link during the course of an ultrasonic examination. Particularly in the case of active (or in-motion) processes, this has the advantage that the individual phases of movement can be studied at leisure.

To this end an image recording apparatus is already known in which the fluorescent screen image of a television monitor can be light-projected onto a film. In the case of this prior-known apparatus, in order to retain a sequential record in a correct fashion (suitable for filing), of an exposure series occurring, in particular, in the case of longer examinations, several series-arranged sets of lenses can be respectively inserted in the path of rays between the fluorescent screen of the television monitor and the film plane. A separate shutter is associated with each of these lenses. In the case of this installation, depending upon the type of inserted lens arrangement, either an individual, correspondingly enlarged, or several, correspondingly reduced, photographic exposures of the fluorescent screen of the television monitor can be light-projected adjacent one another onto a large-format standardized film sheet which is also suitable for filing. For this purpose, the selected lens group must on the average be adjusted over a relatively extensive linear path. The various stages of an examination sequence can, in this fashion, be preserved adjacent one another and can also be mutually compared at leisure. However, it is a peculiarity of this prior-known image recording apparatus that erroneous exposures can come about on account of the complicated operation. This can lead to the loss of the information which was to be stored photographically in some cases. Since the arrangements capable of insertion in this apparatus are equipped with four or six, or even nine, sets of lenses, and since they accordingly form an image of the television image on the entire, a fourth, or a ninth of the surface of the film sheet, these sets of lenses also have different focal lengths. This, in turn, has as a consequence that their distance from the television monitor and the distance of the television monitor relative to the film plane is to be correspondingly differently adjusted depending upon the inserted lens group. A mistake in the location of the insertion plane alone can lead to unsharp images which are not suitable for medical use. In addition, the adjustment of the different lens groups is quite time-consuming. Therefore, in continuous examinations this image recording apparatus can be employed only restrictedly.

SUMMARY OF THE INVENTION

The object underlying the invention resides in modifying an image recording apparatus such that operating errors, or adjustment errors, respectively, are reliably avoided with the lowest possible outlay. In addition, the attainable photographic exposure frequency is to be increased as far as possible.

Therefore, in the case of an image recording apparatus of the type initially cited, various lens supports, each equipped with a different number of lenses, in accordance with the invention, are positioned in the image recording apparatus in respective waiting positions with the lens groups outside the optical path of rays; a positioning drive is provided for selective movement of each lens group individually to a centered position in the optical path of rays; a selector mechanism for selecting the film subdivision is associated with each of these lens supports; and an additional positioning drive is connected in parallel with the lens support positioning drives for changing the distance of the television monitor relative to the photographic exposure position for the film sheets. Through this structure it is ensured that the lens groups are introduced into the path of rays at the respectively correct distance relative to the film plane and that simultaneously the distance of the television monitor from the film plane is matched to the focal length of the respectively inserted lenses.

In an expedient embodiment of the invention, the lens supports can be insertable in the path of rays at varying distances from the image plane. It thereby becomes possible to dispense with a displacement (or movement) of the film plane. Simultaneously, this measure considerably facilitates the arrangement of the waiting positions of the lens supports in the housing of the image recording apparatus.

The storage and filing of the film sheets is particularly facilitated if, in a further development of the invention, the photographic exposure fields, which are together capable of being light-projected onto a film sheet, leave a non-exposable binding (or filing) margin along an edge of the film sheet. This measure which can be achieved through a location of the film sheet at the photographic exposure position such that the film sheet has its center laterally offset relative to the central axis of optical path of rays, has the advantage that the film sheet can be here perforated or otherwise bound without loss of information. This measure also brings the additional advantage that the film sheets can be preferably or exclusively transported by engagement of this binding margin between cooperating pairs of transport rollers. The sensitive area of the emulsion layer, carrying the image information, can thus be free of engagement with the transport rollers.

In a particularly advantageous further development of the invention, the optical path of rays can be deflected through 90° with the interpositioning of a reflecting (or mirror) surface. This construction avoids an excessively great overall length dimension of the image recording apparatus. Simultaneously this construction offers the basic condition for more extensive designs.

Thus, in a further development of the invention, the reflecting surface can be selectively pivotal out of the optical path of rays, and a camera, a photographic camera or a cine camera, can be mounted on the housing of the image recording apparatus such that it is centered relative to the non-deflected path of rays. In addition to the file image, this method of construction also permits the provision of diapositive and cinematographic records.

In an expedient further development of the invention the mirror can be arranged between the monitor and the first lens plane. This has the advantage that the two legs of the optical path of rays can be designed to be approximately of equal length. This results in a particularly good space utilization and smallest housing dimensions.

Further details of the invention shall be explained in greater detail on the basis of an exemplary embodiment illustrated in the figures of the accompanying sheets of drawings; and other objects, features and advantages will be apparent from this detailed disclosure and from the appended claims.

DETAILED DESCRIPTION

Figure 1:
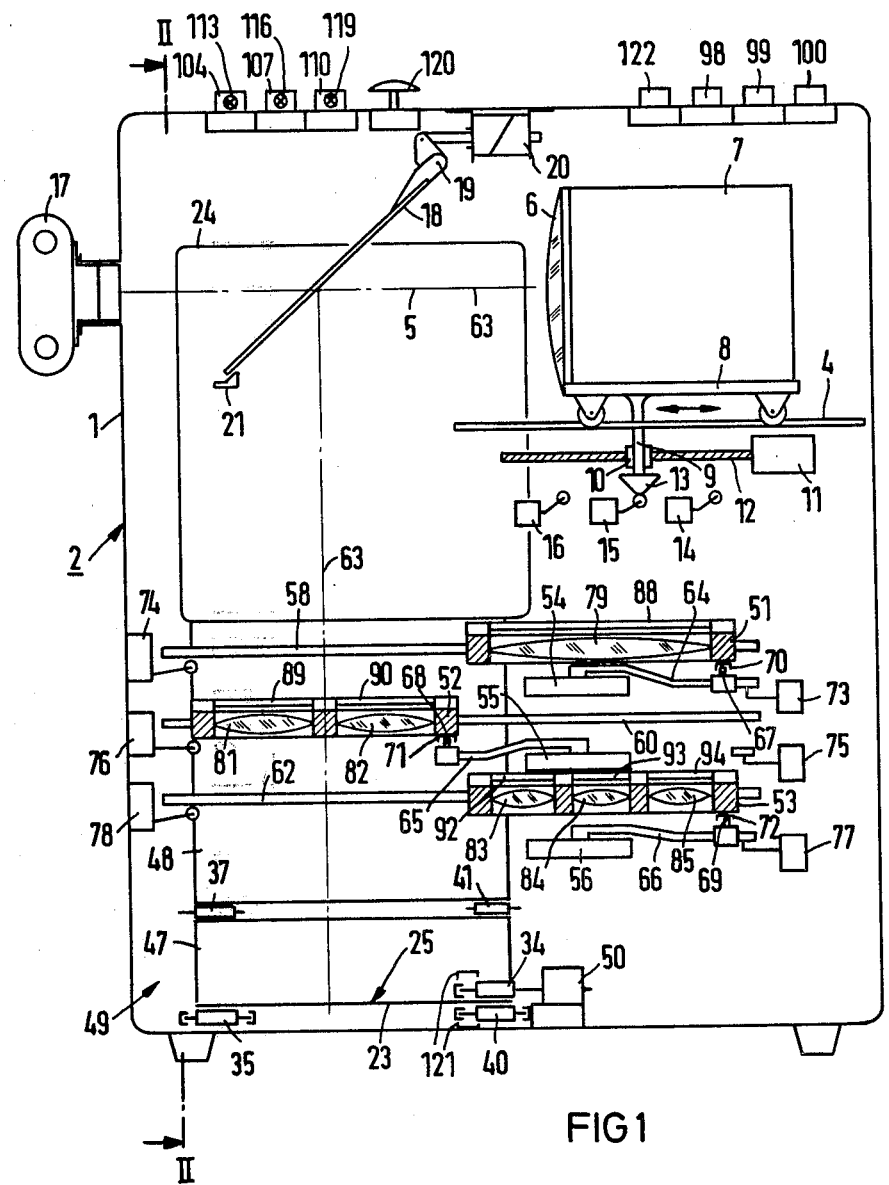
FIG. 1 illustrates somewhat diagrammatically a sectional representation of an image recording apparatus.

In FIG. 1, in the housing 1 of the image recording apparatus 2, one recognizes a television monitor 7 including a fluorescent screen 6, displaceable on rails 3, 4 (FIG. 2) in the direction of the mean perpendicular 5 (which coincides with the central axis of the fluorescent screen 6). For this purpose, the television monitor 7 rests on a carriage 8 which can be driven on the rails 3, 4. This carriage is provided with an extension arm (or bracket) 9 which carries an internally threaded nut 10. The nut 10 is engaged with a lead screw or threaded spindle 12 driven by a motor 11. The extension arm 9 also carries a switch actuator cam 13 which is disposed for actuating engagement with several control switches 14, 15, 16, connected in the motor circuit, the switches 14, 15, 16 being positioned at discrete locations along the path of movement of the actuator cam 13, in the housing 1 of the image recording apparatus 2.

Opposite the fluorescent screen 6 of the television monitor 7, a photographic camera 17, aligned with the central axis 5 of the fluorescent screen 6, is flange-mounted on the housing 1 of the image recording apparatus. Between the fluorescent screen 6 of the television monitor 7 and the photographic camera 17, there is disposed a mirror 18, inclined at an angle of 45° relative to the central axis 5. This mirror downwardly deflects through 90° the horizontal path of rays from monitor 7 which rays are otherwise directed toward the photographic camera 17. The mirror, in turn, is pivotal about a horizontal axis 19 and can be folded up out of the path of rays via a lifting solenoid 20. In the operating position shown in FIG. 1 it rests against a limit stop 21.

Figure 2:
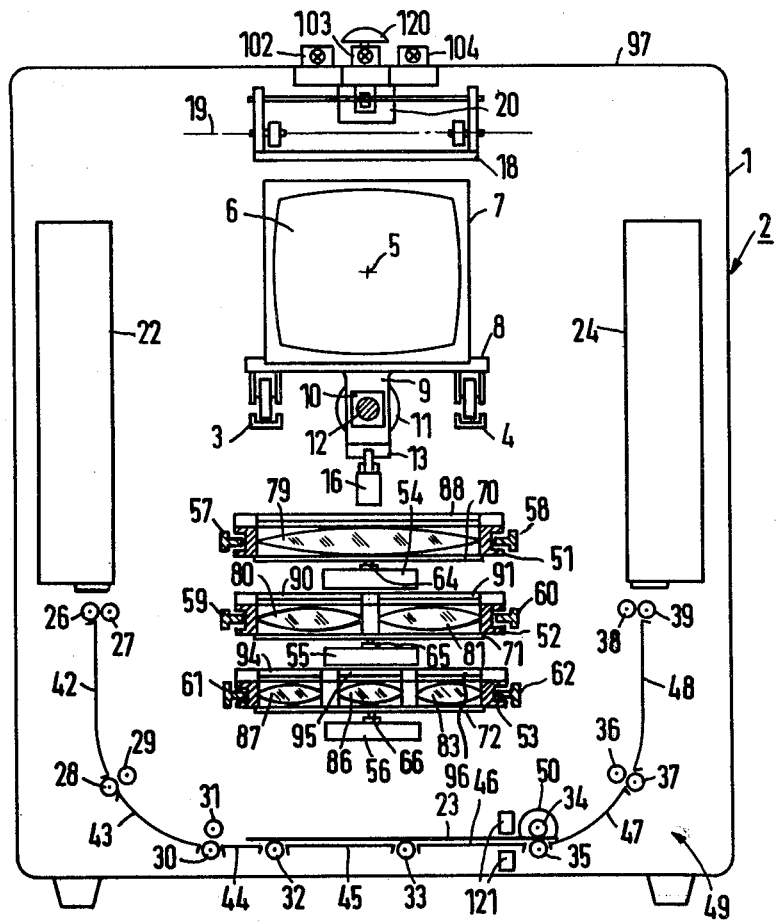
FIG. 2 shows a somewhat diagrammatic view taken along the line II—II of FIG. 1.

Referring to FIG. 2, a supply magazine 22 is shown in the housing 1 of the image recording apparatus 2 at the left, the supply magazine 22 containing unexposed film sheets. A film sheet 23 is indicated at the lower part of FIG. 2, at the exposure position. On the right side of the housing 1 in FIG. 2, a collector magazine 24 for the exposed film sheets is indicated. In FIG. 1, the photographic exposure position is indicated at 25, the film sheet 23 being disposed at the lower left part of the housing 1. The film sheet 23 is associated with a transport system 49 for the film sheets including as shown in FIG. 2 transport rollers 26 through 39 and metal guide plates 42 through 48, as well as with the supply magazine 22 and the collector magazine 24. One of the transport rollers of each superimposed pair such as 34, 40, FIG. 1; or 36, FIG. 1, 41, FIG. 2; is driven by a motor 50 (only one illustrated) so that when the motors are energized the marginal edge of each film sheet is always being driven by at least one pair of rollers in the feed direction. Between the photographic exposure position 25 for the film sheets such as 23 and the mirror 18, in three superimposed planes, one lens support 51, 52, 53, in each instance, is displaceably (or movably) mounted from a waiting position disposed so that the associated group of lenses is laterally offset from the path of rays and arranged at the right side of the housing 1 as shown in the illustration of FIG. 1 for lens supports 51 and 53. The lens groups are individually movable into a position centered relative to the optical path of rays as shown for the case of the lenses of support 52 in FIG. 1. The lens supports 51, 52, 53 are each shiftable to its respective active position by means of a positioning drive, in the present instance, a crank mechanism 54, 55, 56, each being driven by a separately energizable motor. The lens supports are reciprocally movable on respective pairs of guide rails 57 through 62 from the waiting position into the respective operating position. In the operating position, each lens group is centered relative to the optical axis 63, as shown for the lens group of support 52 in FIG. 1. To this end, the free rotating end of each crank 64, 65, 66 has a pin 67, 68, 69 which slides in a U-rail 70, 71, 72, mounted on the associated lens support and disposed transversely to the direction of movement thereof. Associated with each of the lens supports 51, 52, 53 in the waiting position as well as in the operating position, are cooperating limit switches 73, 74, 75, 76, 77, 78 connected in the energizing circuit for the motor driving each crank mechanism. Each of the lens supports 51, 52, 53, carries, adjacent one another, a different number of lenses such as indicated at 79 through 87. Thus, the uppermost lens support 51 carries an individual lens 79 which can form an image of the fluorescent screen 6 on the entire recording surface area of the film sheet 23 which is to be utilized for recording. The middle lens support 52 carries four adjacently arranged lenses such as those shown at 80 and 81 in FIG. 2, and at 81 and 82 in FIG. 1. Each of these lenses can form an image of the fluorescent screen 6 on one of four equal size surface areas adjacently arranged on the film sheet 23 and together covering the entire recording surface to be utilized. The lowest lens support 53 carries three rows of three lenses each. Each of these nine lenses such as 83 through 87, in the operating position, can form an image of the fluorescent screen 6 of the television monitor 7 on a specific area segment of the film sheet 23. The area segments on which respective images of the monitor screen 6 have been formed on the film sheet by the nine lenses of this lens support are disposed in a rectilinear array covering the entire recording area of the film sheet which is available for image recording. Directly above each lens such as lenses 79 through 87, a separate, electrically actuatable shutter such as 88 through 96 is arranged.

Figure 3:
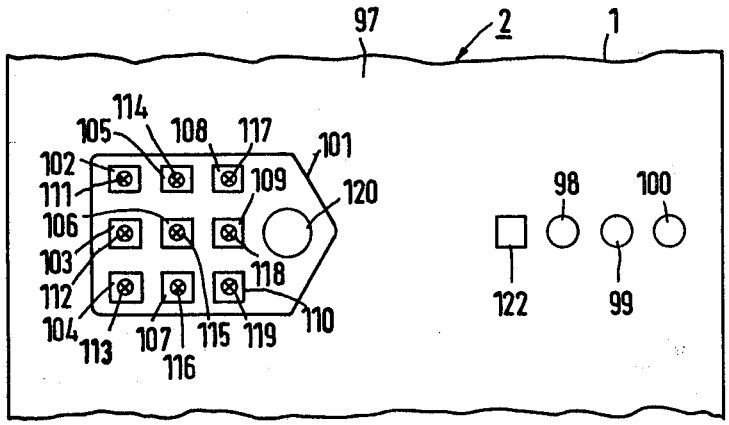
FIG. 3 is a partial plan view showing a bank of selector keys at the upper side of the housing of the image recording apparatus.

On the upper side 97 of the housing 1 as best seen in FIG. 3 three selector keys 98, 99, 100 are provided for selecting the desired degree of film subdivision. These keys each control activation of one of the crank mechanisms 54, 55 or 56 under the control of a corresponding limit switch 74, 76 or 78; and the keys also each activate the motor 11 for the monitor positioning spindle 12, the motor 11 being energized via a respective corresponding control switch 14, 15 or 16. Moreover, one recognizes on the upper side of the housing a bank of keys 101 which is divided in correspondence with the lenses of lens support 53 which has the greatest number of lenses. Through these keys 102 through 110, the respective shutters 88 through 96 associated with the respective lenses 79 to 87 of the active lens support 51, 52, 53 can be individually triggered. In every key a signalling lamp 111 through 119 is installed which, upon triggering of the corresponding shutter, is switched off by the latter. In the selection of a lens support 52 with only four lenses and hence also only four shutters, first only the signalling lamps 111, 113, 117, 119 corresponding to the four corner keys 102, 104, 108, 110 light up. During selection of the lens support 51 with only one shutter 88, only the center key 106 with its signalling lamp 115 is switched on. In addition, one recognizes, on the upper side 97 of the housing 1, a large protruding trigger button 120 which effects the sequential triggering of the respectively following shutter, so that successive actuations of button 120 sequences the relevant series of shutters.

If one desires to retain a photographic series on the film sheet, depending upon the desired enlargement and the number of photographic exposures to be retained, one selects, via the keys 98, 99, 100, mounted at the upper side 97 of the housing 1, that particular one which corresponds to the desired film subdivision. With this key simultaneously the crank mechanism 54, 55 or 56, of the lens support 51, 52 or 53 is switched on which exhibits the corresponding number of lenses 70 through 87. As soon as this lens support actuates the limit switch 74, 76 or 78 (shown at the left in FIG. 1), associated with the operating position, it remains stationary centered relative to the optical axis 63. Simultaneously with the positioning drive for the lens support, however, actuation of the selected key also activates the motor 11 for the spindle 12 under the control of switch 14, 15 or 16, associated with the selected lens support. The active control switch is the one which corresponds to the position which the television monitor 7 must assume for the purpose of focusing adjustment in relation to the selected lens or lens group. The servo motor remains switched on and moves the television monitor 7 until the correspondingly activated control switch 14, 15 or 16, is actuated by the cam 13 on the extension arm 9 and the motor switches off again. The starting up of one of the two outermost control switches simultaneously leads, in a manner not illustrated here, to the polarity reversal of the motor 11 for the purpose of reversal of the direction of rotation thereof. Through the limit switch 74, 76, 78, associated with the working position of the respective lens support, simultaneously via an additional, (not illustrated here) contact set, the shutters 88 through 96 of the selected lens support 51, 52, 53, are connected to the corresponding keys 102 to 110 of the bank of keys 101. Also the signalling lamps 111 through 119, installed in these keys, are connected to voltage via the non-triggered shutters.

If a switched-on key (associated lamp energized) of the bank of keys 101 is depressed, in case this has not already previously occurred, first a single film sheet 23 is taken from the supply magazine 22 and driven via the transport device 49 into the exposure position 25. The presence of a film sheet 23 in the exposure position is sensed by an infrared light barrier 121, FIGS. 1 and 2. Upon reaching this position, the infrared light barrier 121 switches off the transport device 49 and the film sheet remains stationary in the exposure position. In this position, it triggers, via the infrared light barrier 121, the shutter of that particular lens which had been selected via the key of the bank of keys 101. Upon triggering a shutter, the latter again switches off, in a manner not illustrated here, the signalling lamp of precisely this key. All not yet exposed exposure fields of the film sheet 23 can thereby be recognized at any time on the bank of keys 101 by the still switched-on signalling lamps 111 through 119. The shutter, once triggered, can be triggered again only subsequent to renewed film sheet change. Instead of a key of the bank of keys 101, also the general trigger button 120 can be activated. It can be repeatedly activated. Through it the shutters for the individual lenses 79 through 81 of the plate bar 51 through 53, inserted in the path of rays, are triggered in succession; for example in the order corresponding to lamps 111, 117, 113, 119 for lens support 52, and in the order corresponding to lamps 111, 114, 117, 112, 115, 118, 113, 116, 119 for lens support 53.

In this manner, images are formed, successively and adjacent one another, on the film sheet 23, disposed in the exposure position, of the images to be retained occurring in succession on the television monitor, by means of a respectively different lens of the same lens support. As soon as the last of the shutters present on the lens support has been triggered; i.e., when no photographic fields are free any longer on the film sheet 23, the transport device 49 is switched on via a series-connection of the changeover switches associated with the individual shutters 88 through 96. The exposed film sheet is thereby, by means of the transport rollers (34, 40; 36, 41; and 38 and its cooperating roller) transported into the film collector magazine 24, and simultaneously a fresh film sheet is conveyed from the supply magazine 22 by means of the pairs of transport rollers (including the motor-driven rollers 27, 29, and 31).

If the photographic series has been terminated before the film sheet has been fully exposed, the film sheet 23 can nevertheless be conveyed into the film collector magazine by means of a separate trigger button 122 for effecting a film sheet change, which button is arranged on the housing of the image recording apparatus. However, in this case, upon actuation of this trigger button 122, first the fluorescent screen 6 of the television monitor 7 is switched, without image-formation, to bright, and all hitherto not yet triggered shutters 82 through 96 are simultaneously triggered. Only after a time interval sufficient for the exposure is the transport device 49 switched on. It is thereby guaranteed that also those not-utilized surface areas of the film sheet 23 are exposed. Later after development they appear black. In this manner, later, during observation of a bright background, these fields do not interfere with the observation of the other images.

Figure 4:
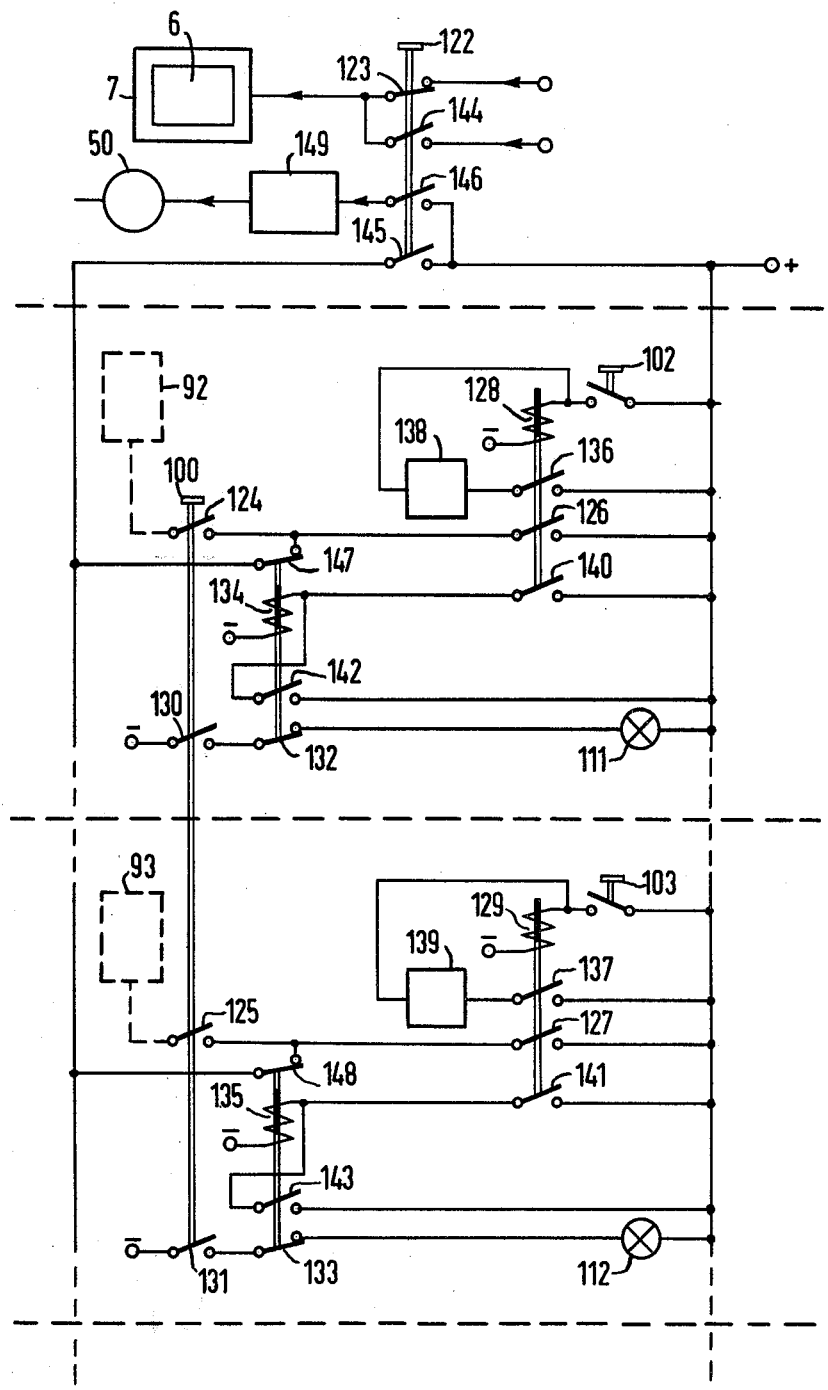
FIG. 4 is an electric circuit diagram showing exemplary details of circuitry for coupling of the control keys of FIG. 3 with the equipment of FIGS. 1 and 2.

FIG. 4 shows the electrical linkage of the television monitor 7 to the trigger button 122 for the motor 50 provided for the transport of the film sheets, as well as the linkage of the various keys 102 through 110 (only keys 102, 103 are illustrated) for the opening of respectively one shutter 88 through 96 (only illustrated for the shutters 92, 93) of one of the lenses 79 through 87 with the appertaining signal lights 111 through 119 (only the signal lights 111, 112 are illustrated). In general, the image output signal pends at the television monitor 7 via the contact 123. The transparency of the examination subject is therefore to be seen on the luminescent screen 6 of the television monitor 7. If, for example, the ninth subdivision has been selected via one of the selection keys 98, 99, 100 provided on the top side 97 of the housing 1 with which the film subdivision can be selected, by pressing, for example, the selection key 100, then the crank mechanism 56 (FIG. 1) has been activated and the plate bar or lens support 53 with the nine lenses 83 through 87 including the appertaining shutters 92 through 96 has been inserted into the beam path. With the contacts 124, 125 of this selection key 100, however, at the same time the nine shutters 92, 93, 94, 95, 96 (only five are illustrated) on this plate bar 53 are electrically connected to the appertaining working contacts 126, 127 (only two are illustrated in FIG. 4) of a respective trigger relay 128, 129 (only two are illustrated) of the keys 102 through 110 and the appertaining signal lights 111 through 119 (only 111 and 112 are illustrated in FIG. 4) are applied to voltage via the contacts 130, 131 of the selection key 100 and the contacts 132, 133 of a signal light relay 134, 135 (only two are illustrated) connected in series thereto. These signal lights, therefore, are illuminated.

If, for example, one of the keys 102, 103 is now triggered, then the corresponding trigger relay 128, 129 receives voltage, switches a time function element 138, 139 on via its self-locking contact 136, 137, said time function element holding the trigger relay 128, 129 at voltage for a specific, preadjustable time interval even when the exposure key 102, 103 is released. With its working contact 126, 127, the trigger relay 128, 129 at the same time holds the respectively appertaining shutter 92, 93 at voltage until the trigger relay is switched off via the time function element 138, 139. At the same time the trigger key 102, 103 is depressed, however, the signal light relay 134, 135 is also applied to voltage via the contacts 140, 141 in this time interval prescribed by the time function element 138, 139. The signal light relay is held at voltage via the self-locking contact 142, 143 and at the same time disconnects the contacts 132, 133 for the signal lamps 111, 112, so that the respectively appertaining signal light is extinguished. That results in the fact that, as soon as one of the exposure keys 102 through 110 is depressed, the appertaining signal light 111 through 119 is extinguished in the depressed key and the appertaining shutter 88 through 96 is driven for the duration with which the time function element 138, 139 holds the appertaining trigger relay 128, 129 to voltage.

If, after the end of the exposure series but still before the complete exposure of the film sheet 23 situated in the exposure position 25, a new film sheet is to be brought into the beam path, then the trigger button 122 is pressed for this purpose. The contact 123 is disconnected by means of this trigger button, so that the transparency at the television monitor 7 is extinguished. At the same time, the contacts 144, 145, 146 are closed with the trigger key 122. The transparency of the television monitor is uniformly sensitized via the contact 144. Via the contact 145, voltage is applied to the corresponding shutters 92, 93 via the closed auxiliary contacts 147, 148 of the signal light relay 134, 135 which has not yet been triggered and upon bypassing the working contacts 126, 127 of the trigger relay 128, 129. By so doing, these shutters which had previously not been driven are now driven. In those shutters 92, 93, however, which had previously been triggered by pressing the corresponding exposure key 102 through 110 and in which, consequently, the signal lights had been extinguished via the signal light relay 134, 135, the corresponding auxiliary contacts 147, 148 had also been disconnected. These shutters, thus, remain without current and, thus, closed when key 122 is pressed despite the closing of the contact 145. All remaining shutters which had previously not yet been triggered, however, are driven when the trigger button 122 is pressed and the corresponding film sections which had not yet been exposed are exposed with the uniformly bright image of the luminescent screen 6 of the television monitor. Via the contact 146 of the trigger button, moreover, the motor 50 for the transport of the exposed film sheet 23 into the collecting magazine 22 and for transporting a new film sheet from the supply magazine 22 into the exposure position 25 is switched on via time delay element 149.

It will be apparent that many modifications and variations will be effected without departing from the scope of the novel concepts and teachings of the present invention.

We claim as our invention:

1. Image recording apparatus comprising a housing, a lens assembly in said housing comprising a plurality of lenses arranged adjacently and a separate shutter for each of said lenses, a photographic exposure position, a television monitor having a fluorescent screen for emitting light rays along an optical path of rays, film supply and collector magazine means, a transport device for the conveyance of individual film sheets from said magazine means into said photographic exposure position, and from the photographic exposure position into the magazine means, characterized in said lens assembly having respective shiftable lens supports (51, 52, 53) supporting respective sets of said lenses (79 through 87), said lens supports (51, 52, 53) each having an inactive position in which the associated set of lenses is offset from said optical path of rays and having an active position in which the associated set of lenses is operatively interposed in said optical path of rays, lens positioning drives (54, 55, 56) each connected with one of said lens supports (51, 52, 53) for selectively shifting each of said lens supports from the inactive position to said active position, a selector mechanism (98, 99, 100) for selecting a desired film subdivision and coupled with the lens positioning drives (54, 55, 56) for controlling the selective actuation of said positioning drives to effect positioning of the set of lenses corresponding to the selected film subdivision in said active position, and an additional positioning drive (9 through 16) operative for adjusting the distance of the television monitor (7) relative to the photographic exposure position (25), and responsive to actuation of said selector mechanism (98, 99, 100) for adjusting the distance between said television monitor (7) and the photographic exposure position (25) in accordance with the film subdivision selected by said selector mechanism.

2. Image recording apparatus according to claim 1, characterized in that the sets of lenses carried by the respective lens supports (51, 52, 53) are arranged for insertion at different locations along the path of rays.

3. Image recording apparatus according to claim 1, with said transport device being of configuration to position a film sheet at the photographic exposure position so as to occupy a film sheet total area at said exposure position which has a longitudinally disposed margin area at one side of the path of the film sheets and a remaining major film sheet recording area, the lens assembly defining photographic fields which can be altogether light-projected exclusively onto said major film sheet recording area, while leaving unexposed the longitudinally disposed margin area, thereby to provide for a non-exposable binding margin along the length of an edge of each film sheet (23).

4. Image recording apparatus according to claim 1, characterized in mirror means (18) disposed in the optical path of rays (63) for deflecting the light rays emitted from the television monitor by approximately 90° toward the photographic exposure position.

5. Image recording apparatus according to claim 4, characterized in that the mirror means (18) is mounted for selective pivotal movement from its operative position to a position out of the optical path of rays (63) and that a camera (17) is mounted on the housing (1) and is centered relative to the non-deflected optical path of rays extending from the fluorescent screen toward the operative position of the mirror means.

6. Image recording apparatus according to claim 4, characterized in that the mirror means (18) is arranged between the television monitor (7) and a first lens plane (57, 58) of the lens assembly.

7. Image recording apparatus according to claim 1, characterized in that the shutters (88 through 96) of the individual lenses (79 through 87), arranged on the lens supports (51, 52, 53) are capable of being triggered successively in a predetermined order, and a program control comprising a trigger button (120) for actuation to initiate a complete sequential operation of the shutters of a selected set of lenses in said predetermined order.

8. Image recording apparatus according to claim 1, characterized in that a control console (97) for the purpose of individual selection of the photographic exposure field to be exposed on the film sheet (23) comprises a bank of keys (101) arranged in an array corresponding to a set of lenses of said lens assembly providing a maximally subdivided exposure field at said exposure position.

9. Image recording apparatus according to claim 8, characterized in said bank of keys (101) including respective keys (102 to 110), each key having a signalling lamp (111 through 119) associated therewith, only those signalling lamps being switched on which correspond to the film subdivision respectively selected by the selector mechanism (98, 99, 100), and, upon triggering of the corresponding shutter (88 through 96) the respective corresponding signalling lamp being individually switched off in response to operation of the respective shutter.

10. Image recording apparatus according to claim 1, characterized in the shutters (88 through 96) associated with the operatively disposed set of lenses and with non-exposed photographic exposure fields, being triggered in response to a manually generated film sheet change signal prior to the switching-on of the transport device (49), the television monitor (7) being switched to a brightness corresponding to a complete film exposure during the exposure of a film at such non-exposed locations.

11. Image recording apparatus according to claim 1, characterized in that the lens positioning drives (54, 55, 56) comprises respective individually operable crank mechanisms for shifting the respective lens supports to their respective active positions.

* * * * *